United States Patent Office 3,269,423
Patented August 30, 1966

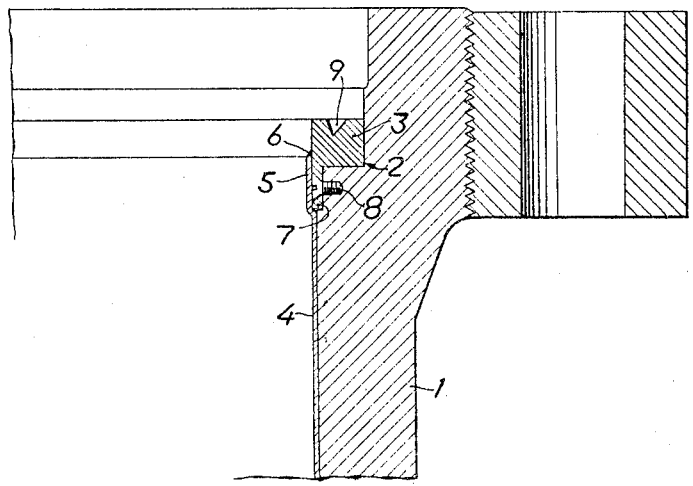
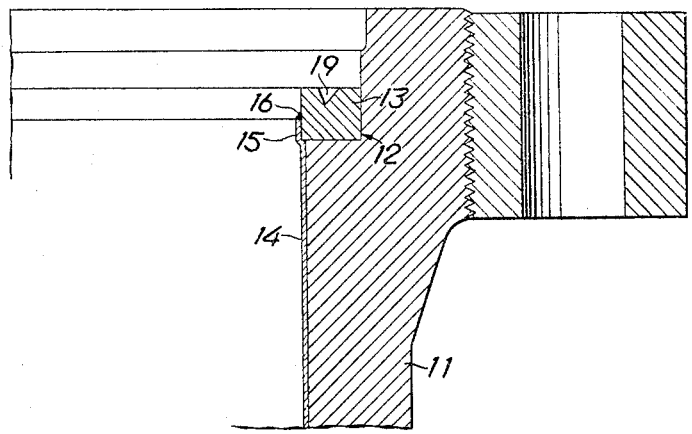

3,269,423
LINING STRUCTURE
Asahiko Goto, Nada-ku, Kobe, Japan, assignor to Kobe Steel Works, Ltd., Kobe, Japan
Filed Aug. 5, 1963, Ser. No. 300,015
Claims priority, application Japan Aug. 15, 1962, 37/46,758
4 Claims. (Cl. 138—140)

This invention relates to a corrosion resistant metal lining structure. More particularly, the present invention relates to mounting a liner of a corrosion resistant metal inside a hollow body made of another metal.

The term "corrosion resistant metal" or the like as used in the specification and claims is intended to mean a corrosion resistant metal and alloy, e.g. titanium, zirconium, tantalum, titanium base alloy, zirconium base alloy, tantalum base alloy, which is not readily weldable to other metal from which the body to be lined is made. It should also be understood that a hollow body to which the anti-corrosive liner is to be mounted according to this invention refers to any equipment having a circular cross section and made of a metal such as soft steel, stainless steel, typical examples of such body being distillation towers, reaction towers, tanks columns, pipes and the like which are employed in the field of petrolic chemical and other chemical industries and various fluid transportation and storage handling a corrosive liquid or gas.

Titanium, zirconium, tantalum and their alloys are well known to be excellent in corrosion-resistant property, so that it has been proposed to use these materials as a liner for a body desired to be rendered corrosion resistant. However, this proposal has encountered with difficulties particularly because these metals and their base alloys are not readily weldable to other metals. Therefore it is an object of this invention to provide a corrosion resistant metal lining structure rigidly secured to a body made of another metal.

Briefly the above and other objects of this invention are achieved by forming an enlarged or enlarged stepped portion on the inner wall of the body adjacent the end portion of a liner, fitting and securing in said enlarged recess an annular member made of the same material as that of the liner, overlapping the end portion of the liner upon the inner surface of the said annular member and welding the liner end to the annular member.

The invention will best be understood from the following detailed description taken in connection with the accompanying drawings in which:

FIG. 1 is a longitudinal section of a vessel with a liner embodying the present invention; and FIG. 2 is a view similar to FIG. 1 but showing another embodiment of the invention.

Referring to FIG. 1 the reference numeral 1 denotes the main body or vessel to be lined. At the inner periphery thereof adjacent the end portion there is deeply formed a large diameter stepped portion, recess or counterbore 2 in which is shrinkage-fitted, expansion-fitted, pressure-fitted or otherwise fitted an annular member 3 made of a corrosion resistant metal such as titanium. Then, a liner 4 (of the same material as that of the annular member) applied to the inner wall of said body 1 is overlapped at its end portion 5 upon the inner surface of said annular member 3, and then both are welded as shown at 6. In this case, as shown, the annular member 3 is formed at its inner and lower end with a skirt portion 7 which is also overlapped upon the inner wall surface of the body 1 and which is then secured thereto by set screws 8, which are covered by the end portion of the liner 4. Indicated with the reference numeral 9 is an annular groove provided at the upper end surface of the annular member 3. A packing or gasket (not shown) may be received in this groove.

In case that a liner composed of high corrosion resistant metal such as titanium, zirconium or tantalum is to be applied to a main body composed of another metal such as of an iron family, these two metals can not be welded together, so that it is very difficult to rigidly secure the end of the liner to the body.

According to this invention, however, the inner wall of the main body 1 is formed at the inner end with the recessed stepped portion 3 in which is closely fitted the annular member 3 made of the same material as that of the liner 4, while the end portion 5 of said liner 4 is overlapped upon the inner surface of the annular member 3 and then is welded, so that the liner 4 and main body 1 are extremely intimately joined together with the annular member therebetween. Further, since the end surface of the annular member 3 is closely contacted with a packing of the mating flange or the like to provide fluid-tight sealing, there will be no possibility of corrosive fluid intruding into a clearance between the liner 4 and main body 1, and thus the purpose of lining is effectively realized. Further, since the present lining end structure is so arranged as to have the annular member 3 and liner 4 welded together, the possibility of leakage of corrosive fluid from the juncture between them is completely eliminated. Particularly, this structure is so adapted as to support the outer surface of the annular member 3 by the inner surface of the stepped portion 2, with the result that when the internal pressure acts outwardly, there will be no possibility of fracture of the annular member 3, thus its pressure resistant power being very high.

The embodiment shown in FIG. 2 is same as that shown in FIG. 1 except that the annular member 13 has no lower skirt portion.

What I claim is:
1. A structure of the class described comprising:
 (a) a hollow body having an open end,
 (b) a liner of corrosion resistant metal, and
 (c) means for securing said liner to the inner face of said hollow body,
 (d) said hollow body having an annular recess in its inner face adjacent its open end,
 (e) said means comprising an annular member of said corrosion resistant metal,
 (f) said annular member being closely fitted in said recess,
 (g) said liner having an annular end portion overlapping and juxtaposed to the inner surface of said annular member,
 (h) said annular end portion being joined to the inner surface of said annular member by a fluid tight weld.
2. A structure as defined in claim 1, wherein
 (i) said annular member has a lower skirt portion,

(j) said means comprises set screws securing said skirt portion to the inner wall of the hollow body, and (k) said liner overlies and covers said set screws.

3. A structure as defined in claim 1, wherein said annular member has an annular packing groove in its upper end surface.

4. A structure as defined in claim 1, wherein said corrosion resistant metal is selected from the class consisting of titanium, zirconium, tantalum, titanium base alloy, zirconium base alloy, and tantalum base alloy.

References Cited by the Examiner

UNITED STATES PATENTS

| 2,056,160 | 10/1936 | Allen | 29—525 |
| 2,895,747 | 7/1959 | Bland et al. | 285—55 |
| 2,919,936 | 1/1960 | Hurley | 285—55 |

LAVERNE D. GEIGER, *Primary Examiner.*

H. ARTIS, *Assistant Examiner.*